(12) United States Patent
Tai

(10) Patent No.: US 8,436,580 B2
(45) Date of Patent: May 7, 2013

(54) BATTERY CONTROL CIRCUIT

(75) Inventor: Fang-Ta Tai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 375 days.

(21) Appl. No.: 12/967,018

(22) Filed: Dec. 13, 2010

(65) Prior Publication Data
US 2012/0112548 A1  May 10, 2012

(30) Foreign Application Priority Data

Nov. 9, 2010  (TW) .................................. 99138417

(51) Int. Cl.
*H02J 7/00* (2006.01)
(52) U.S. Cl.
USPC ............................ 320/117; 320/116; 320/126
(58) Field of Classification Search ................... 320/117
See application file for complete search history.

(56) References Cited

U.S. PATENT DOCUMENTS

| | | | | |
|---|---|---|---|---|
| 4,114,082 A * | 9/1978 | Scheidler | ...................... | 320/117 |
| 4,297,629 A * | 10/1981 | Godard et al. | ................. | 320/117 |
| 5,121,046 A * | 6/1992 | McCullough | ................. | 320/117 |
| 5,650,974 A * | 7/1997 | Yoshimura | ..................... | 365/229 |
| 5,731,732 A * | 3/1998 | Williams | ....................... | 327/434 |
| 5,739,669 A * | 4/1998 | Brulhardt et al. | ............. | 320/128 |
| 6,222,344 B1 * | 4/2001 | Peterson et al. | ............... | 320/119 |
| 6,268,711 B1 * | 7/2001 | Bearfield | ....................... | 320/117 |
| 6,737,756 B1 * | 5/2004 | Gale et al. | .......................... | 290/7 |
| 7,378,757 B2 * | 5/2008 | Nakata | ............................ | 307/71 |
| 2003/0042870 A1 * | 3/2003 | Yau et al. | ....................... | 320/117 |
| 2006/0097707 A1 * | 5/2006 | Inoshita et al. | ................ | 323/222 |
| 2006/0198169 A1 * | 9/2006 | Tsai et al. | ........................ | 363/34 |
| 2008/0174274 A1 * | 7/2008 | Kosaka et al. | ................ | 320/117 |
| 2008/0180061 A1 * | 7/2008 | Koski et al. | .................... | 320/117 |
| 2008/0290834 A1 * | 11/2008 | Umetsu | .......................... | 320/107 |
| 2009/0085515 A1 * | 4/2009 | Bourilkov et al. | ............. | 320/117 |
| 2009/0206812 A1 * | 8/2009 | Sasaya et al. | ................. | 323/282 |

* cited by examiner

*Primary Examiner* — Arun Williams
(74) *Attorney, Agent, or Firm* — Altis Law Group, Inc.

(57) ABSTRACT

A battery control circuit includes an electronic switch, first and second diodes, and first and second batteries. A positive terminal of the first battery is connected to a positive terminal of the second battery through the first diode. A negative terminal of the first battery is connected to a positive terminal of the second battery through the electronic switch, and connected to a negative terminal of the second battery through the second diode. When the electronic switch receives a first control signal, the electronic switch is turned on, the first and second diodes are turned off, and the first and second batteries are connected in series. When the electronic switch receives a second control signal, the electronic switch is turned off, the first and second diodes are turned on, and the first and second batteries are connected in parallel.

6 Claims, 2 Drawing Sheets

BATTERY CONTROL CIRCUIT

BACKGROUND

1. Technical Field

The present disclosure relates to control circuits, and particularly to a battery control circuit.

2. Description of Related Art

Generally, a notebook computer adapts a number of lithium batteries connected in series, to supply a fixed operation voltage, such as 11.1 volts. When the notebook computer is in a standby state or a sleep state, the voltage required by the notebook computer will be reduced. However, the lithium batteries continue to offer the fixed operation voltage, thereby, resulting in energy waste.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
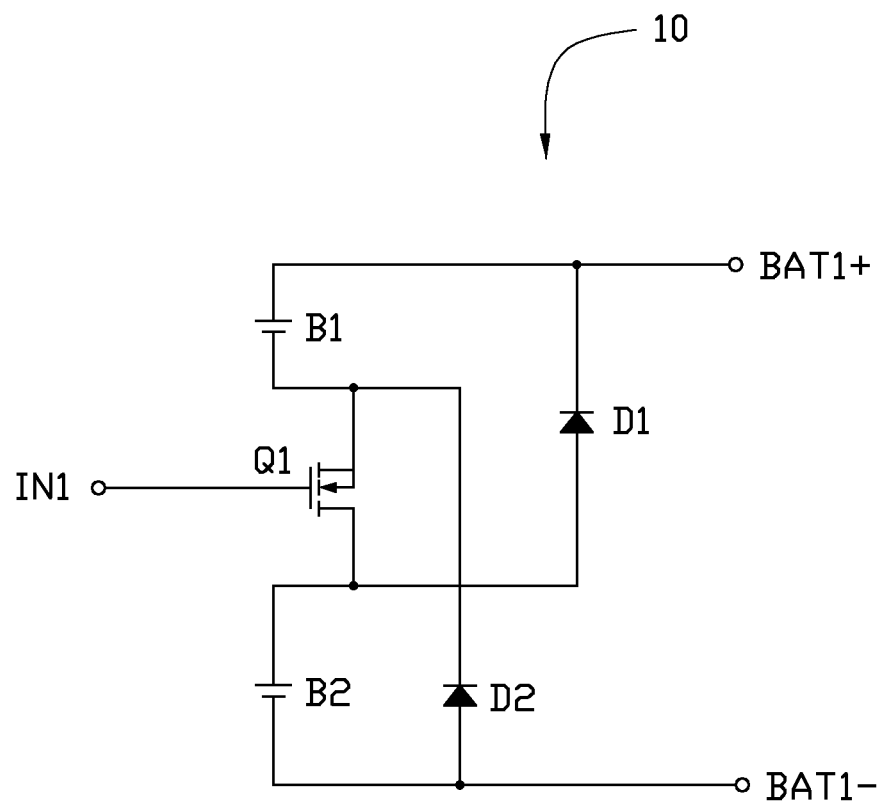
FIG. 1 is a circuit diagram of a battery control circuit in accordance with a first embodiment.

Referring to FIG. 1, a first embodiment of a battery control circuit 10 includes an input terminal IN1, two output terminals BAT1+ and BAT1−, an electronic switch Q1, two batteries B1 and B2, and two diodes D1 and D2.

A positive terminal of the battery B1 is connected to the output terminal BAT1+, and connected to a cathode of the diode D1. A negative terminal of the battery B1 is connected to a first terminal of the electronic switch Q1, and connected to a cathode of the diode D2. A positive terminal of the battery B2 is connected to a second terminal of the electronic switch Q1, and connected to an anode of the diode D1. A negative terminal of the battery B2 is connected to the output terminal BAT1−, and connected to an anode of the diode D2. A third terminal of the electronic switch Q1 is connected to the input terminal IN1, to receive control signals.

In the present embodiment, the battery control circuit 10 is assembled in a notebook computer (not shown). The input terminal IN1 is connected to a power management system or a south bridge chip of the notebook computer, to receive the control signals from the power management system or the south bridge chip. The output terminals BAT1+ and BAT1− output power to the notebook computer. The batteries B1 and B2 are the same type rechargeable batteries with the same voltage. The electronic switch Q1 is an n-channel metal-oxide-semiconductor field-effect transistor (MOSFET), the first, second, and third terminals of the electronic switch Q1 are respectively a source, a drain, and a gate.

When the notebook computer is in a working state, the input terminal IN1 receives a high level first control signal from the power management system or the south bridge chip. The electronic switch Q1 is turned on, the diodes D1 and D2 are turned off, the batteries B1 and B2 are connected in series, and voltage output between the output terminals BAT1+ and BAT1− is equal to a sum of the voltages of the batteries B1 and B2.

When the notebook computer is in a standby state or a sleep state, the input terminal IN1 receives a low level second control signal from the power management system or the south bridge chip. The electronic switch Q1 is turned off, the diodes D1 and D2 are turned on, the batteries B1 and B2 are connected in parallel, and voltage output between the output terminals BAT1+ and BAT1− is equal to the voltage of each of the batteries B1 and B2.

When the batteries B1 and B2 are recharged by applied voltage generated by renewable energy, such as solar energy, the input terminal IN1 receives the second control signal from the power management system or the south bridge chip. The electronic switch Q1 is turned off, the diodes D1 and D2 are turned on, and the batteries B1 and B2 are connected in parallel. In this condition, when the applied voltage is slightly larger than the voltage of each of the batteries B1 and B2, the batteries B1 and B2 can be recharged.

Figure 2:
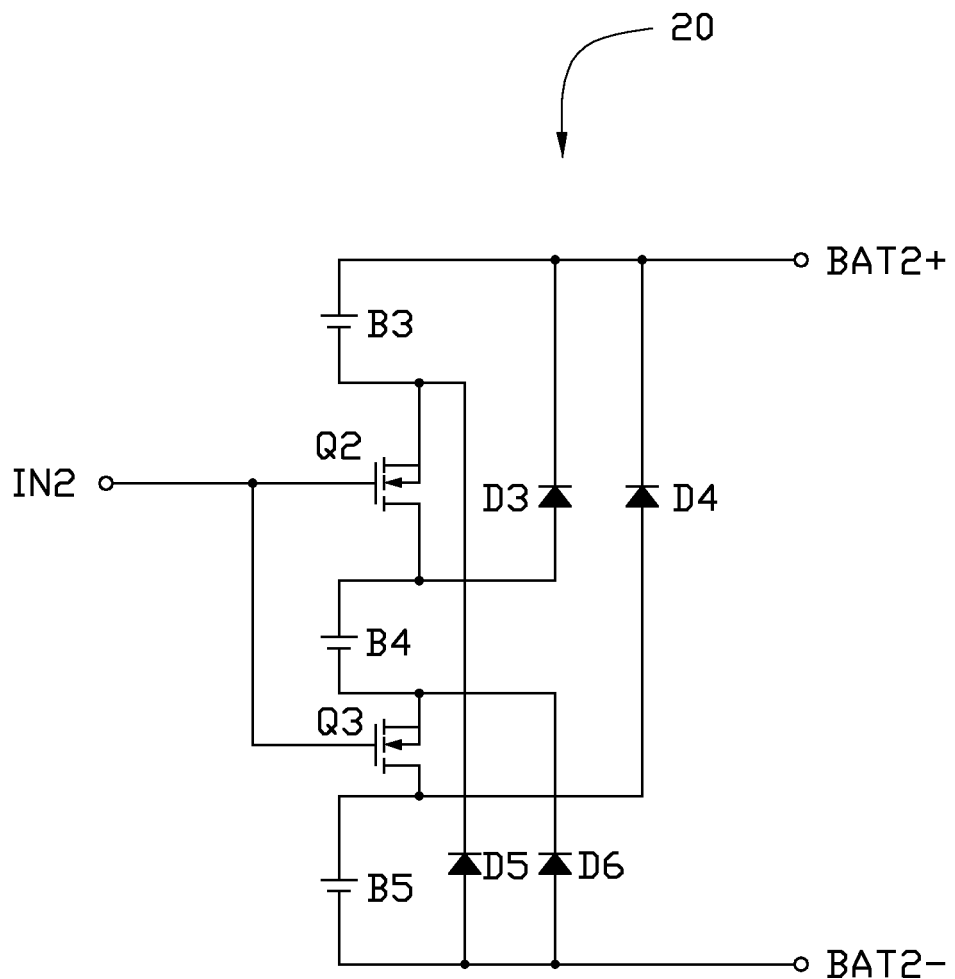
FIG. 2 is a circuit diagram of a battery control circuit in accordance with a second embodiment.

Referring to FIG. 2, a second embodiment of a battery control circuit 20 includes an input terminal IN2, two output terminals BAT2+ and BAT2−, two electronic switches Q2 and Q3, three batteries B3-B5, and four diodes D3-D6.

A positive terminal of the battery B3 is connected to the output terminal BAT2+, and connected to cathodes of the diodes D3 and D4. A negative terminal of the battery B3 is connected to a first terminal of the electronic switch Q2, and connected to a cathode of the diode D5. A positive terminal of the battery B4 is connected to a second terminal of the electronic switch Q2, and connected to an anode of the diode D3. A negative terminal of the battery B4 is connected to a first terminal of the electronic switch Q3, and connected to a cathode of the diode D6. A positive terminal of the battery B5 is connected to a second terminal of the electronic switch Q3, and connected to an anode of the diode D4. A negative terminal of the battery B5 is connected to the output terminal BAT2−, and connected to anodes of the diodes D5 and D6. Third terminals of the electronic switches Q2 and Q3 are connected to the input terminal IN2, to receive control signals.

In the present embodiment, the battery control circuit 20 is assembled in a notebook computer (not shown). The input terminal IN2 is connected to a power management system or a south bridge chip of the notebook computer, to receive the control signals from the power management system or the south bridge chip. The output terminals BAT2+ and BAT2− output power to the notebook computer. The batteries B3-B5 are the same type rechargeable batteries with the same voltage. The electronic switches Q2 and Q3 are n-channel MOSFETs, the first, second, and third terminals of each of the electronic switches Q2 and Q3 are respectively a source, a drain, and a gate.

When the notebook computer is in a working state, the input terminal IN2 receives a high level first control signal from the power management system or the south bridge chip. The electronic switches Q2 and Q3 are turned on, the diodes D3-D6 are turned off, the batteries B3-B5 are connected in series, and voltage output between the output terminals BAT2+ and BAT2− is equal to a sum of the voltages of the batteries B3-B5.

When the notebook computer is in a standby state or a sleep state, the input terminal IN2 receives a low level second control signal from the power management system or the south bridge chip. The electronic switches Q2 and Q3 are turned off, the diodes D3-D6 are turned on, the batteries B3-B5 are connected in parallel, and voltage output between the output terminals BAT2+ and BAT2− is equal to the voltage of each of the batteries B3-B5.

When the batteries B3-B5 are recharged by applied voltage generated by renewable energy, such as solar energy, the input terminal IN2 receives the second control signal from the power management system or the south bridge chip. The electronic switches Q2 and Q3 are turned off, the diodes D3-D6 are turned on, and the batteries B3-B5 are connected in parallel. In this condition, when the applied voltage is slightly larger than the voltage of each of the batteries B3-B5, the batteries B3-B5 can be recharged.

In other embodiments, the battery control circuits 10 and 20 may be assembled in other electronic devices employing a plurality of batteries to supply power. The input terminals IN1 and IN2 are connected to a power management system of the electronic devices to receive control signals. The electronic switches Q1-Q3 may be p-channel MOSFETs, or transistors, or other switches having similar functions, and voltage levels of the first and second control signals can be adjusted according to actual need. Further, in the other embodiments, the number of the batteries included in each of the battery control circuits 10 and 20 can be adjusted according to actual need. When adding one battery in each of the battery control circuits 10 and 20, the number of the electronic switches should be added one and the number of the diodes should be added two accordingly.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A battery control circuit comprising:
an input terminal to receive control signals;
first and second output terminals to output power;
first and second diodes;
an electronic switch comprising a first terminal connected to the input terminal, a second terminal, and a third terminal;
a first battery comprising a positive terminal connected to the first output terminal and a cathode of the first diode, and a negative terminal connected to the second terminal of the electronic switch and a cathode of the second diode; and
a second battery comprising a positive terminal connected to the third terminal of the electronic switch and an anode of the first diode, and a negative terminal connected to the second output terminal and an anode of the second diode;
wherein in response to the input terminal receiving a first control signal, the electronic switch is turned on, the first and second diodes are turned off, and the first and second batteries are connected in series; and
wherein in response to the input terminal receiving a second control signal, the electronic switch is turned off, the first and second diodes are turned on, and the first and second batteries are connected in parallel.

2. The battery control circuit of claim 1, wherein the electronic switch is an n-channel metal-oxide-semiconductor field-effect transistor (MOSFET), the first, second, and third terminals of the electronic switch are a gate, a source, and a drain respectively.

3. The battery control circuit of claim 1, wherein the first and second batteries are the same type rechargeable batteries with the same voltage.

4. A battery control circuit comprising:
an input terminal to receive control signals;
first and second output terminals to output power;
first to fourth diodes;
first and second electronic switches, each of the first and second electronic switches comprising a first terminal connected to the input terminal, a second terminal, and a third terminal;
a first battery comprising a positive terminal connected to the first output terminal and cathodes of the first and second diodes, and a negative terminal connected to the second terminal of the first electronic switch and a cathode of the third diode;
a second battery comprising a positive terminal connected to the third terminal of the first electronic switch and an anode of the first diode, and a negative terminal connected to the second terminal of the second electronic switch and a cathode of the fourth diode; and
a third battery comprising a positive terminal connected to the third terminal of the second electronic switch and an anode of the second diode, and a negative terminal connected to the second output terminal and anodes of the third and fourth diodes;
wherein in response to the input terminal receiving a first control signal, the first and second electronic switches are turned on, the first to fourth diodes are turned off, and the first to third batteries are connected in series; and
wherein in response to the input terminal receiving a second control signal, the first and second electronic switches are turned off, the first to fourth diodes are turned on, and the first to third batteries are connected in parallel.

5. The battery control circuit of claim 4, wherein each of the first and second electronic switches is an n-channel MOSFET, the first, second, and third terminals of each of the first and second electronic switches are a gate, a source, and a drain respectively.

6. The battery control circuit of claim 4, wherein the first to third batteries are the same type rechargeable batteries with the same voltage.

* * * * *